(12) United States Patent
Albrecht

(10) Patent No.: US 6,279,996 B1
(45) Date of Patent: Aug. 28, 2001

(54) HEADREST ARRANGEMENT FOR A VEHICLE SEAT

(75) Inventor: Björn Albrecht, Meine (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/433,407

(22) Filed: Nov. 3, 1999

(30) Foreign Application Priority Data

Nov. 4, 1998 (DE) .............................................. 198 50 754

(51) Int. Cl.⁷ ...................................................... A47C 7/36
(52) U.S. Cl. ............................ 297/403; 297/408; 297/409
(58) Field of Search ................................... 297/403, 408, 297/409

(56) References Cited

U.S. PATENT DOCUMENTS

| | | | |
|---|---|---|---|
| 3,170,725 | * | 2/1965 | Komorwoski ................ 297/403 X |
| 3,174,799 | * | 3/1965 | Haltenberger ................ 297/403 |
| 3,186,763 | * | 6/1965 | Ferrara ....................... 297/403 X |
| 3,304,120 | * | 2/1967 | Cramer ....................... 297/403 |
| 3,449,012 | * | 6/1969 | Caron ........................ 297/403 |
| 4,351,563 | * | 9/1982 | Hattori ....................... 297/408 |
| 4,576,411 | * | 3/1986 | Kitamura .................... 297/403 X |
| 4,623,166 | * | 11/1986 | Andres et al. ............... 297/403 X |
| 4,711,494 | * | 12/1987 | Duvenkamp ................ 297/403 |
| 4,822,102 | | 4/1989 | Duvenkamp ................ 297/403 |
| 4,865,388 | * | 9/1989 | Nemoto ...................... 297/403 |
| 5,026,120 | * | 6/1991 | Takeda et al. ............... 297/408 |
| 5,642,918 | * | 7/1997 | Sakamoto et al. ............ 297/408 |
| 5,669,668 | * | 9/1997 | Leuchtmann ................ 297/403 X |
| 6,045,181 | * | 4/2000 | Ikeda et al. ................. 297/408 X |
| 6,113,192 | * | 9/2000 | Schneider ................... 297/403 |

FOREIGN PATENT DOCUMENTS

| | | | |
|---|---|---|---|
| 3020558 | * | 12/1981 | (DE) ........................ 297/403 |
| 31 36 648 | | 3/1983 | (DE) . |
| 33 32 729 | | 3/1985 | (DE) . |
| 3545142 | * | 6/1987 | (DE) ........................ 297/403 |
| 39 12 403 | | 10/1990 | (DE) . |
| 4126518 | * | 2/1993 | (DE) ........................ 297/403 |
| 42 27 697 | | 2/1994 | (DE) . |
| 94 17 320 | | 2/1995 | (DE) . |
| 0238770 | | 9/1987 | (EP) . |
| 2106380 | * | 4/1983 | (GB) ........................ 297/403 |
| 21 32 479 | | 7/1984 | (GB) ........................ 297/403 |

* cited by examiner

Primary Examiner—Peter M. Cuomo
Assistant Examiner—Rodney B. White
(74) Attorney, Agent, or Firm—Baker Botts LLP

(57) ABSTRACT

A one-piece headrest on a motor vehicle seat fits into a recess of the seat backrest so that, in its storage position, it is flush with the contour of the backrest and is swingably mounted on slide rails permitting it to be moved into an operative position.

4 Claims, 1 Drawing Sheet

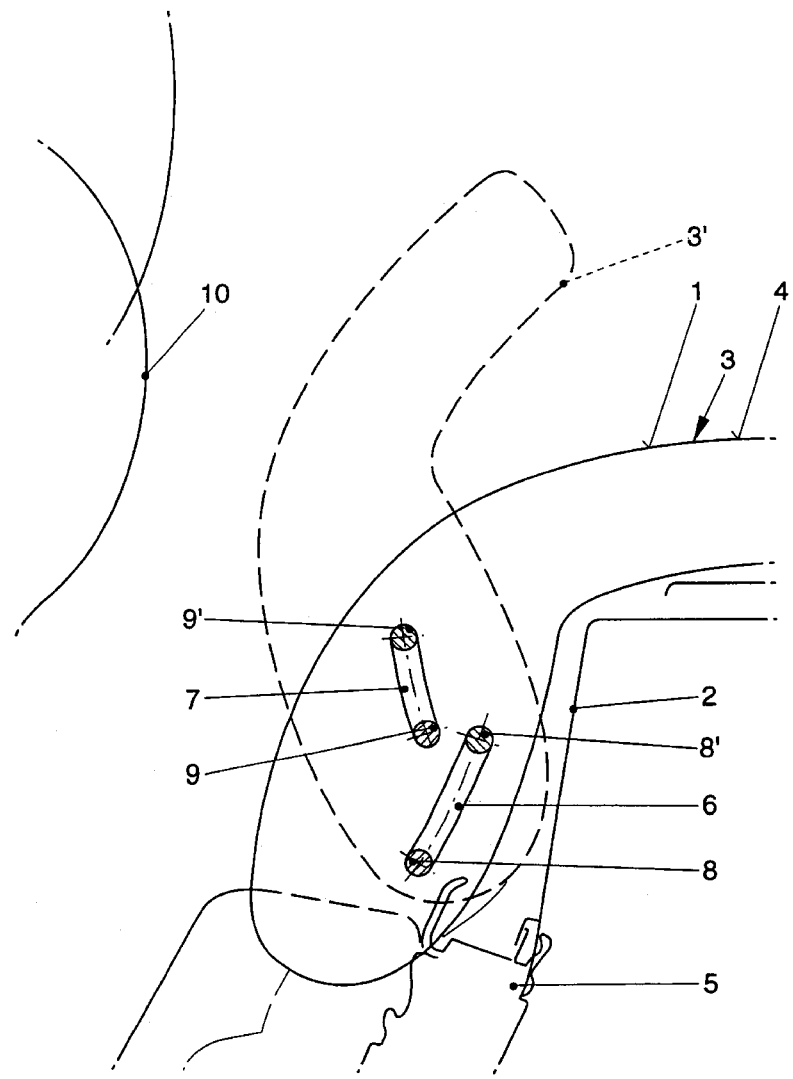

HEADREST ARRANGEMENT FOR A VEHICLE SEAT

BACKGROUND OF THE INVENTION

This invention relates to headrest arrangements for vehicle seats which can be pivoted from a storage position to an operative position.

A headrest arrangement disclosed in U.S. Pat. No. 4,822,102 provides a transversely subdivided, two-piece headrest forming two angles as viewed from the side and capable of swinging about a fixed backrest pivot between an operating position in which it extends substantially as a continuation of the backrest and a storage position in which it either rests on a storage shelf behind the backrest or rests in a depression when the two pieces are at their maximum separation. Apart from the fact that this conventional arrangement requires a special configuration of the storage shelf to provide a depression, with the result that the storage shelf cannot be configured in the normal way for its usual function, the design of the headrest itself is complicated by its two-piece construction and by the relative mobility of the two pieces. In this prior art arrangement, the two-piece construction of the headrest is provided to permit vertical adjustment of the headrest regardless of its proximity to the head of the vehicle occupant to be protected which can be adjusted by inclination of the headrest.

Another conventional headrest arrangement, described in German Offenlegungsschrift No. 31 36 648, has a backrest formed with a flat depression into which the headrest fits in its storage position. The headrest can be swung upward from the storage position into its operating position about a fixed axis, for example, in response to activation of an electric switch integrated in the seat cushion. The upward swinging motion is motorized by a pinion-and-sector drive connection. A disadvantage of this prior art arrangement, which has a one-piece headrest structure in contrast to the two-piece structure described in the reference discussed above, is that the height of the headrest cannot be adjusted and thereby adapted to the head position of a particular occupant.

German Offenlegungschrift No. 33 32 729 discloses a headrest with a non-fixed axis of swing by which the headrest is moved between a storage position in which it is located in a depression of the storage shelf and an operative position along curvilinear rails having the shape of a circular arc attached to the backrest.

SUMMARY OF THE INVENTION

Accordingly, it is an object of the present invention to provide a headrest arrangement for a vehicle seat which overcomes disadvantages of the prior art.

Another object of the invention is to provide a headrest arrangement having a simple, one-piece construction which, firstly, will not impair the visual appearance of the back seat in its storage position and, secondly, can be optimally adapted in its operating position to the height of a vehicle occupant.

These and other objects of the invention are attained by providing a headrest arrangement for a vehicle seat which has a one-piece construction with a boomerang shape in side view with the convex side facing the direction of travel of the vehicle.

The boomerang-like shape of the headrest permits full-sized accommodation of the headrest in a depression or recess in the backrest and, with the convex-side of the headrest facing forwardly, the height of the headrest and its proximity to the head of the seat occupant can be adjusted by using suitable couplings to provide optimal conditions in terms of safety engineering. Thus, the setting of the height of the headrest and its proximity to the head of the occupant is selectable by a suitable configuration of a multiple linkage with a view to obtaining empirically optimal pairs of values of these two parameters.

BRIEF DESCRIPTION OF THE DRAWINGS further objects and advantages of the invention will be apparent from a reading of the following description in conjunction with the accompanying single drawing figure which is a view in longitudinal section schematically illustrating a representative embodiment of a bench seat of a motor vehicle in the region of the headrest arranged in accordance with the invention.

DESCRIPTION OF PREFERRED EMBODIMENTS

In the typical embodiment of the invention as shown in the drawing, a backrest 1 of a rear seat of a vehicle, is illustrated along with a transverse member 2 extending behind the backrest. To the right, as seen in the figure, the backrest arrangement is adjoined by the conventional storage shelf which is not shown since it is not involved in the arrangement of the components essential to the invention.

The headrest is shown in its storage position, designated 3, which it assumes when there is no occupant in the seat associated with it. When the seat is occupied, the headrest can be swung mechanically into its operating position 3', shown in dotted lines, by actuation of a seat contact switch. The headrest has a convex anterior side 4 which, in the storage position, is flush with the contour 1 of the backrest. As shown in the drawing, the headrest is shaped in side view more or less like a boomerang, forming an angle which is especially distinct in the back of the headrest, thus readily adapting the headrest to the contour 1 of the backrest.

To complete the description, it should be noted that a conventional ski bag opening 5 is provided in the backrest to permit loading of skis by passing them through the backrest from the rear of the vehicle. This shows that the headrest arrangement according to the invention does not interfere with the conformation of the vehicle with respect to other aspects.

When the seat associated with the headrest is occupied by a vehicle occupant, the headrest is swung counterclockwise, as seen in the drawing figure, out of its storage position 3 so that pins 8 and 9 in the headrest are pivoted around corresponding oblong holes 6 and 7 in the backrest. The pins 8 and 9, which slide in the oblong holes or guides 6 and 7, move to positions designated 8' and 9', respectively, when the headrest is in its operating position 3'.

In accordance with the invention, therefore, a headrest arrangement is provided which, for optimal adjustment of height and proximity to the head of the occupant, utilizes a simple one-piece headrest construction that is shaped so that its anterior side is flush with the contour of the backrest in the storage position. It should be noted that "one-piece", as used herein, refers to the external appearance of the headrest which, of course, may be composed of a plurality of internal components.

Although the invention has been described herein with reference to specific embodiments, many modifications and variations therein will readily occur to those skilled in the art. Accordingly, all such variations and modifications are included within the intended scope of the invention.

I claim:
1. A vehicle seat comprising:
a backrest;
a headrest having a one-piece construction including an anterior side, a back side, and two opposing side faces connecting the anterior and back sides;
a linkage coupling the headrest to an upper portion of the backrest for swinging the headrest out of a storage position into an operating position and including slide guides permitting coupled adaptation of the height of the headrest and of a proximity of the headrest to a head of a vehicle occupant,
wherein the headrest has a convex anterior side and, when viewed from either of the two opposite side faces, a shape of two legs extending at an angle with its apex facing in a direction toward the anterior side of the headrest.

2. A vehicle seat according to claim 1 wherein each of said slide guides comprises an oblong hole in the backrest and a pin arranged in a side face of the headrest and sliding the oblong hole.

3. A vehicle seat according to claim 1 wherein the linkage comprises two slide guides on each side of the headrest.

4. A vehicle seat according to claim 1 wherein the backrest has a recess in the upper portion to accommodate the headrest in its storage position and the headrest has a contour providing an essentially continuous transition to an adjacent contour of the backrest when the headrest is in the storage position.

* * * * *